United States Patent [19]

Davis

[11] Patent Number: 4,943,118
[45] Date of Patent: Jul. 24, 1990

[54] END DUMPING TRAILER

[76] Inventor: Louis Davis, 4501 North Washington, Turlock, Calif. 95380

[21] Appl. No.: 320,703

[22] Filed: Mar. 7, 1989

[51] Int. Cl.⁵ .............................................. B60P 1/28
[52] U.S. Cl. .................................... 298/12; 298/1 A
[58] Field of Search ............. 298/1 A, 2, 5, 12, 14–16, 298/17.5, 22 R; 280/142, 482, 405.1, 407.1; 296/184

[56] References Cited

U.S. PATENT DOCUMENTS

| | | | |
|---|---|---|---|
| 709,210 | 9/1902 | Eagen | 298/12 |
| 1,063,945 | 6/1913 | Abigt | 298/12 |
| 1,533,419 | 4/1925 | Hug | 298/12 |
| 1,780,775 | 11/1930 | Williams | 298/12 |
| 2,741,383 | 4/1956 | Leckert | 298/12 |
| 3,001,825 | 9/1961 | Rouse | 298/12 |
| 3,429,465 | 2/1969 | Gardner | 298/12 |
| 4,111,485 | 4/1978 | Martin | 298/12 |
| 4,702,662 | 10/1987 | Marlett | 298/12 |
| 4,811,988 | 3/1989 | Immel | 298/12 |

Primary Examiner—Joseph F. Peters, Jr.
Assistant Examiner—Clifford T. Bartz
Attorney, Agent, or Firm—Flehr, Hohbach, Test, Albritton & Herbert

[57] ABSTRACT

End dumping semitrailer having an elongated frame supported toward the rear by ground engaging wheels, a bed substantially shorter than the frame mounted on the frame for movement between a travelling position in front of the wheels and a drawn back position toward the rear of the frame, and means for tilting the bed for dumping to the rear of the frame when the bed is in the drawn back position.

12 Claims, 5 Drawing Sheets

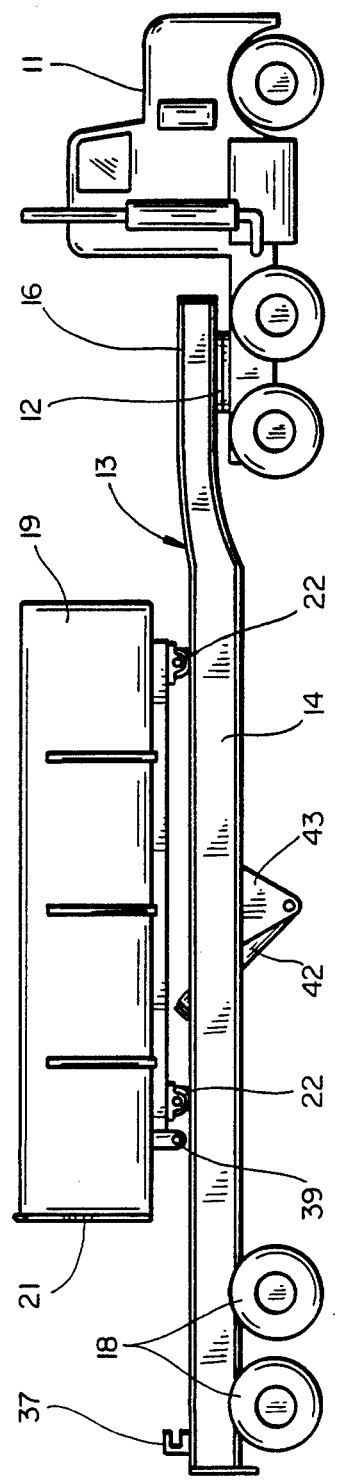

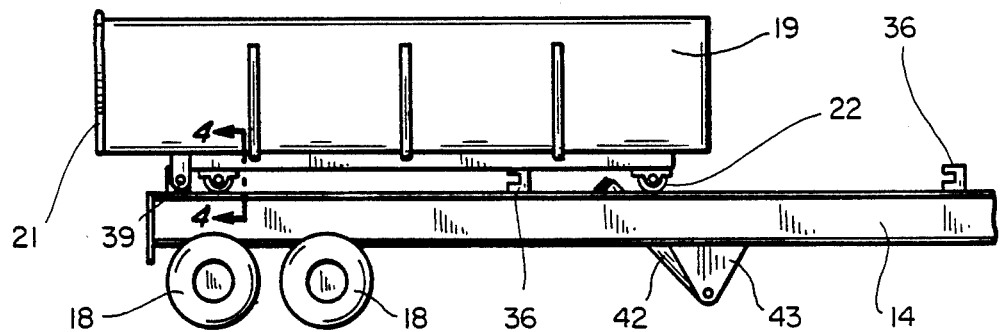
FIG_2
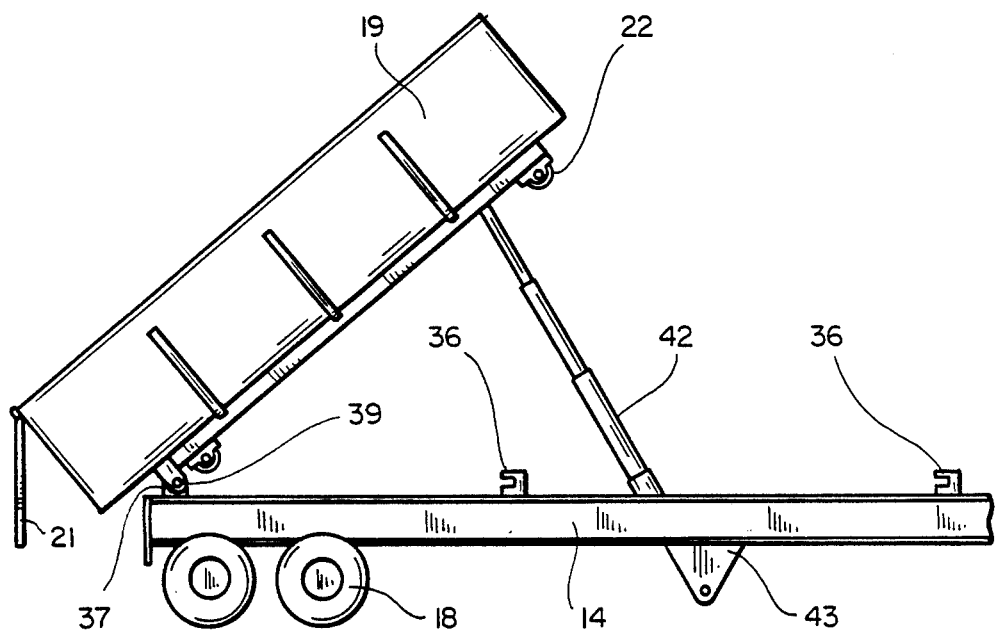
FIG_3

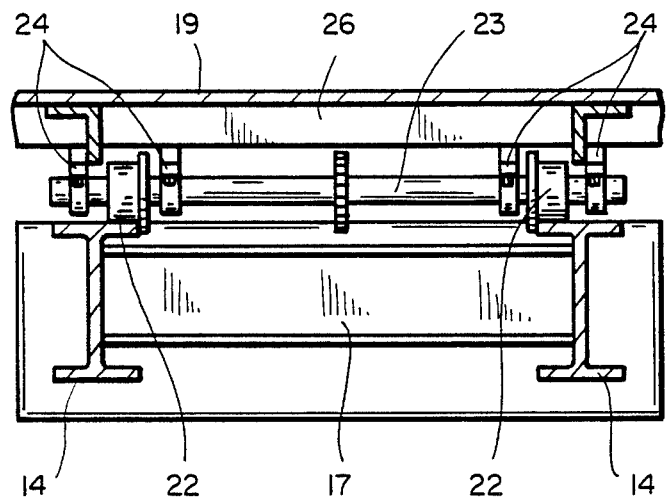
FIG_4
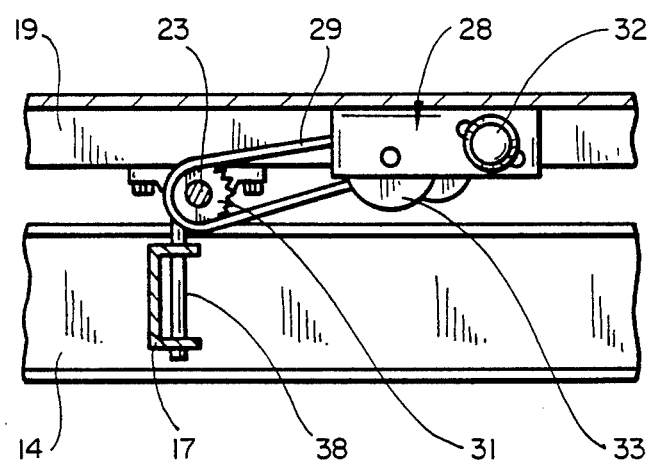
FIG_5

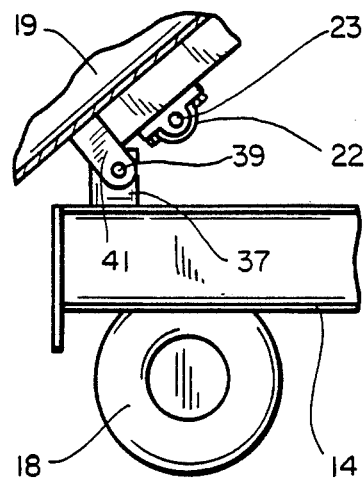
FIG_6
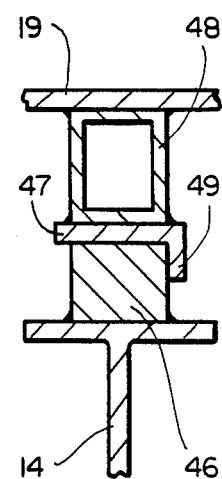
FIG_8
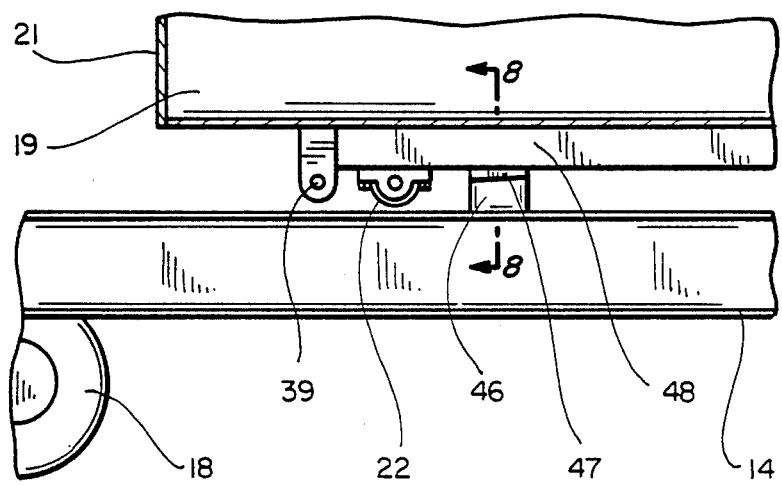
FIG_7

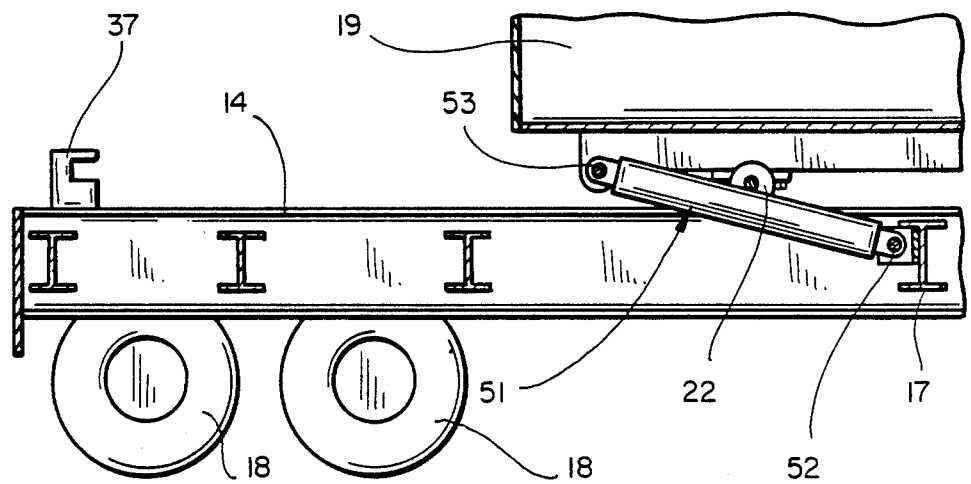
FIG_9
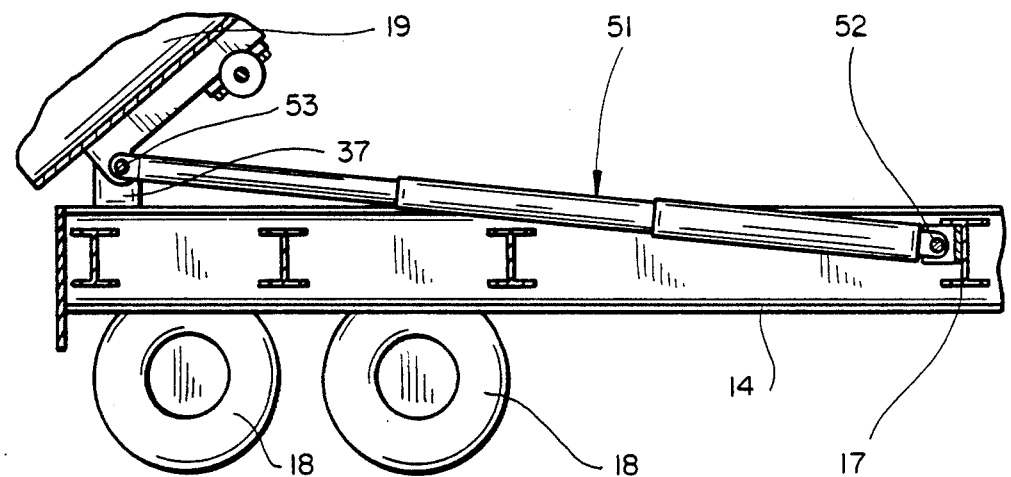
FIG_10

END DUMPING TRAILER

This invention pertains generally to trucks and trailers and, more particularly, to a trailer for hauling large loads of dirt, rocks and other materials.

Large trucks and trailers are commonly employed in construction work for hauling dirt, rocks and other frangible materials. The amount of material which any given truck or trailer can carry is limited by the size of the truck or trailer, by the weight of the load, and by regulations limiting the weight per wheel or axle which can be transported on the highway.

One type of trailer heretofore employed for hauling dirt, rocks and the like is commonly known as a transfer trailer. These trailers have a bed removably mounted on a frame supported by front and rear axles, with a drawbar or tongue for connection to a truck. Such trailers can carry relatively large loads, but they are cumbersome to unload. To do so, it is necessary to disconnect the trailer from the truck and dump the load from the truck bed. The truck is then backed up to the trailer, and the trailer bed is rolled off the trailer frame into the truck bed. The truck is then moved to the dump site, and the load is dumped from trailer bed. The truck must then be backed up to the trailer frame again, and the trailer bed is rolled back onto the trailer frame. Thereafter, the trailer is reconnected to the truck.

Another type of trailer employed in construction work is a semitrailer which typically has two rear axles and is supported at the front by the fifth wheel of the truck or tractor to which it is connected. These trailers have a bed mounted on a frame, and they are unloaded by raising the front end of the bed and dumping the load out the back end of the bed. In the raised position, the trailer is relatively unstable. The wheels on the forwardmost axle often come off the ground, leaving all the weight of the trailer and the load on the rearmost axle. The bed is generally longer than the frame, and there is a danger that the trailer may fall or be blown over. The load which a semitrailer can carry is limited by the "bridge law", i.e. the distance between the rear axle of the pulling vehicle and the axles of the trailer.

It is in general an object of the invention to provide a new and improved trailer for hauling dirt, rocks and other materials.

Another object of the invention is to provide a trailer of the above character which overcomes the limitations and disadvantages of trailers heretofore provided.

These and other objects are achieved in accordance with the invention by providing a semitrailer having an elongated frame supported toward the rear by ground engaging wheels, a bed substantially shorter than the frame mounted on the frame for movement between a travelling position in front of the wheels and a drawn back position toward the rear of the frame, and means for tilting the bed for dumping to the rear of the frame when the bed is in the drawn back position.

FIG. 1 is a side elevational view of one embodiment of a trailer according to the invention, with the trailer connected to a pulling vehicle and the bed of the trailer in a travelling position.

FIG. 2 is a fragmentary side elevational view of the embodiment of FIG. 1, with the bed of the trailer in a drawn back position.

FIG. 3 is a fragmentary side elevational view of the embodiment of FIG. 1, with the bed of the trailer in a dumping position.

FIG. 4 is a cross sectional view taken along line 4—4 in FIG. 2.

FIG. 5 is a fragmentary sectional view of the embodiment of FIG. 1.

FIG. 6 is a fragmentary side elevational view, partly broken away, of the embodiment of FIG. 1.

FIG. 7 is a fragmentary side elevational view of another embodiment of a trailer according to the invention.

FIG. 8 is a cross sectional view taken along line 8—8 in FIG. 7.

FIG. 9 is a fragmentary sectional view of another embodiment of a trailer according to the invention, with the bed of the trailer in a travelling position.

FIG. 10 is a fragmentary sectional view of the embodiment of FIG. 9 with the bed of the trailer in a dumping position.

In FIG. 1, the invention is illustrated in connection with a pulling vehicle 11 which can be any suitable truck or tractor of conventional design. This vehicle has a fifth wheel 12 to which the trailer is connected in load supporting relationship.

The trailer has an elongated frame 13 having a pair of longitudinally extending rails 14 with a gooseneck 16 at the front end of the rails. The gooseneck is connected to the fifth wheel of the pulling vehicle. Crossmembers 17 extend between rails 14. The rear portion of the frame is supported by ground engaging wheels 18 mounted on a pair of laterally extending axles.

A bed 19 is mounted on frame 13 for movement between a forward or travelling position as illustrated in FIG. 1 and a rearward or rolled back position as illustrated in FIG. 2. In the travelling position, the bed is positioned in front of wheels 18, and the load is distributed between the rear wheels of the pulling vehicle and the wheels of the trailer. In the rolled back position, the bed is toward the rear of the frame, with the rear portion of the bed extending behind the rear portion of the frame. The bed is open at the top and has a hingedly mounted tailgate 21 at the rear end thereof.

Bed 19 has flanged wheels or rollers 22 which ride upon the upper surfaces of rails 14 to permit rolling movement of the bed between the forward and rearward positions. The bed is substantially shorter than the frame, and in the embodiment illustrated, it has a length of approximately one-half of the length of the frame. Two sets of rollers are provided, one toward the front of the bed and the other toward the rear. The rollers in each set are mounted on an axle 23 which is rotatively mounted in bearing blocks 24 mounted on cross-members 26 on the under side of the bed.

Means is provided for moving bed 19 between the forward and rearward positions on frame 13. This means includes a motor assembly 28 mounted on the under side of bed 19, with a drive chain 29 in engagement with a sprocket 31 on the axle 23 toward the rear of the bed. The motor assembly includes a pair of electrically energized drive motors 32 and a speed reducing transmission 33. In the embodiment illustrated, separate motors are used for driving the bed in the forward and rearward directions, but a single reversible motor can be employed for this purpose, if desired.

Stops 36, 37 are mounted on frame 13 for limiting the forward and rearward movement of bed 19. Stops 36 comprise rearwardly facing hooks which receive axles 23 when the bed is in the forward position. A retractable latch pin 38 is mounted on one of the cross-members 17 for engagement with the back side of rear axle 23 to lock the bed in the forward or travelling position. Stops 37 comprise forwardly facing hooks which receive laterally extending pins 39 when the bed is in the rearward position. Each of the pins 39 is mounted between a pair of downwardly extending yoke arms 41 on the under side of the bed. Hooks 37 are positioned toward the rear of the bed, behind rear axle 23.

Means is provided for lifting the front end of the bed to tilt the bed to a dumping position when it is in the rolled back or rearward position on the frame. This means comprises a hydraulic ram or operator 42 which is pivotally mounted at its lower end on a mount 43 on the under side of the frame. The upper end of the ram is not connected to the bed, but simply pushes against a pad (not shown) on the under side of the bed. When retracted, the ram rests in a cradle carried by a crossmember of the frame.

As best illustrated in FIG. 6, hooks 37 and pins 39 provide a pivotal connection between the bed and the frame when the bed is in its rolled back position and the pins are received in the hooks. The pins are aligned axially of each other, and the bed rotates about the axis of the pins as it is raised to the dumping position by ram 42.

Operation and use of the trailer are as follows. In the travelling position, bed 19 is horizontal or level, and it is positioned in front of wheels 18. Axles 23 are received in hooks 36 to prevent forward movement of the bed, and pin 38 is raised behind the rear axle 23 to prevent rearward movement of the bed. Hoist 42 is retracted and rests in its carriage beneath the bed. The trailer is loaded in a conventional manner, e.g. by loading dirt or another material into the bed through its open top. With the bed in the forward position, the weight of the load is distributed between the rear wheels of the pulling vehicle and the wheels of the trailer, and the trailer is ready for travel on the highway.

To unload the trailer, pin 38 is retracted, and motor assembly 28 is actuated to drive rear rollers 22 and thus move the bed to the rolled back position toward the rear of the frame. When the bed reaches the rearward position, hooks 37 engage pins 39, and the drive motor is de-energized. To dump the load, ram 42 is extended, lifting the front end of the bed to tilt the bed about the axis of pins 39. As the bed is raised to the dumping position, tailgate 21 swings open and the load is discharged from the bed to the rear of the frame. When the dumping is completed, ram 42 is retracted, and the bed is lowered until rollers 22 once again engage the rails of the frame. When the ram is fully retracted and clear of the bottom side of the bed, motor assembly 28 is once again actuated to return the bed to its forward or travelling position. When hooks 36 engage axles 23, pin 38 is raised to lock the bed in the forward position.

The embodiment of FIG. 7 is generally similar to the embodiment of FIG. 1, and like reference numerals designate corresponding elements in the two embodiments. The embodiment of FIG. 7 has tapered pads 46, 47 which lift the bed slightly to separate rollers 22 from rails 14 when the bed is in the forward or travelling position. This separation helps to stabilize the bed in the travelling position.

Pads 46 are affixed to rails 14 in position to receive pads 47 when the bed is in the travelling position. Pads 47 are positioned in front of rollers 22 on longitudinally extending rails 48 on the under side of the bed. The upper surfaces of pads 46 and the lower surfaces of pads 47 have matching inclines to provide the desired lifting action as the bed is moved forward. Upper pads 47 have side flanges 49 which engage the inner surfaces of lower pads 46 to provide lateral stability when the bed is in the forward position. Supplemental means can be employed to provide the final forward movement of the bed and the initial rearward movement when the drive rollers are separated from the rails.

The embodiment of FIG. 9 is also generally similar to the embodiment of FIG. 1, and like reference numerals designate corresponding elements in these two embodiments as well. In the embodiment of FIG. 9, however, forward and rearward movement of bed 19 is effected by means of a hydraulic ram 51 instead of motor assembly 28 and drive chain 29. One end of ram 51 is pivotally connected to the frame by a pin 52, and the other end of the ram is pivotally connected to the bed by a pin 53. The axis of pin 53 is aligned with the axes of stop/pivot pins 39. When ram 51 is retracted, the bed is in its forward or travelling position, and when this ram is extended, the bed is in its rolled back or rearward position. In the latter position, the bed can be raised for dumping by means of ram 42, as in the previous embodiments. Since the axis of pin 53 is aligned with the axis about which the bed rotates as it is raised, ram 51 does not have to be disconnected from the bed as it is raised and lowered.

The invention has a number of important features and advantages. Since the weight of the load is distributed between the wheels of the trailer and the wheels of the pulling vehicle when the bed is in the travelling position, the trailer can carry heavier loads than trailers heretofore provided. The load can be dumped to the rear of the trailer without disconnecting the trailer from the pulling vehicle. Moreover, the bed is extremely stable in the raised position, unlike the transfer trailers heretofore provided.

It will be apparent to those familiar with the art that a new and improved end dumping trailer has been provided. While only certain presently preferred embodiments have been described in detail, as will be apparent to those familiar with the art, certain changes and modifications can be made without departing from the scope of the invention as defined by the following claims.

I claim:

1. In an end dumping trailer: an elongated frame supported toward the rear by ground engaging wheels, a single nontelescoping bed substantially shorter than the frame mounted on the frame for movement between a travelling position in front of the wheels and a dumping position toward the rear of the frame, hook and pin means affixed to the rear portions of the bed and the frame for limiting rearward movement of the bed and providing a pivoting connection between the bed and the frame when the bed is in the dumping position, and means for tilting the bed about the pivoting connection for dumping to the rear of the frame when the bed is in the dumping position.

2. The trailer of claim 1 wherein the frame has a pair of longitudinally extending rails, and the bed is mounted on rollers which roll along the rails.

3. The trailer of claim 2 including means for turning the rollers to move the bed along the frame between the travelling position and the dumping position.

4. The trailer of claim 1 wherein the means for tilting the bed includes a hydraulic ram carried by the frame and engageable with the front portion of the bed when the bed is in the dumping position.

5. The trailer of claim 1 including a linear operator connected between the bed and the frame for moving the bed between the travelling position and the dumping position.

6. In an end dumping trailer: an elongated frame having a pair of longitudinally extending rails, means toward the front of the frame for connecting the trailer to a pulling vehicle, ground engaging wheels toward the rear of the frame, a bed mounted on rollers which roll along the rails for movement between a forward position in front of the wheels and a rearward position toward the rear of the frame, a pad mounted in a fixed position on the frame for lifting engagement with the bed to take the rollers out of engagement with the rails as the bed is moved into the forward position, stop members carried by the rear portions of the bed and the frame for engagement with each other to limit rearward movement of the bed and permit pivotal movement of the bed about the rear of the frame, and a ram mounted on the frame for lifting engagement with the front portion of the bed to tilt the bed to a dumping position when the stop members are engaged.

7. In an end dumping trailer: an elongated frame, means toward the front of the frame for connecting the trailer to a pulling vehicle, ground engaging wheels toward the rear of the frame, a bed mounted on the frame for movement between a forward position in front of the wheels and a rearward position toward the rear of the frame, stop members carried by the rear portions of the bed and the frame for engagement with each other to limit rearward movement of the bed and permit pivotal movement of the bed about the rear of the frame, and a ram mounted on the frame for lifting engagement with the front portion of the bed to tilt the bed to a dumping position when the stop members are engaged.

8. The trailer of claim 7 wherein the frame has a pair of longitudinally extending rails, and the bed is mounted on rollers which roll along the rails.

9. The trailer of claim 8 including means for turning the roller to drive the bed along the rails between the forward the rearward positions.

10. The trailer of claim 8 including a linear operator connected between the bed and the frame for moving the bed between the forward and rearward positions.

11. In an end dumping trailer: an elongated frame supported by ground engaging wheels, a bed substantially shorter than the frame mounted on the frame for movement between a travelling position toward the front of the frame and a dumping position toward the rear of the frame, and a hydraulic ram pivotally mounted on the frame and engagable upon extension with the bed to raise the front portion of the bed when the bed is in the dumping position, the ram being out of engagement with the bed when retracted.

12. In an end dumping trailer: an elongated frame supported toward the rear by ground engaging wheels and having a pair of longitudinally extending rails, a bed substantially shorter than the frame mounted on rollers which roll along the rails for movement between a travelling position in front of the wheels and a dumping position toward the rear of the frame, a pad mounted in a fixed position on the frame for lifting engagement with the bed to lift the rollers out of engagement with the rails as the bed is moved into the travelling position, and means for tilting the bed for dumping to the rear of the frame when the bed is in the dumping position.

* * * * *